(12) United States Patent
Coady

(10) Patent No.: US 6,246,736 B1
(45) Date of Patent: Jun. 12, 2001

(54) DIGITAL SIGNAL FRAMING SYSTEMS AND METHODS

(75) Inventor: Alan Charles Coady, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/207,250

(22) Filed: Dec. 9, 1998

Related U.S. Application Data

(60) Provisional application No. 60/097,097, filed on Aug. 19, 1998.

(51) Int. Cl.[7] .................................................... H04L 7/08
(52) U.S. Cl. .......................... 375/368; 375/364; 370/514
(58) Field of Search ................................... 375/368, 365, 375/364; 370/503, 513, 514, 520

(56) References Cited

U.S. PATENT DOCUMENTS

| | | | |
|---|---|---|---|
| 4,016,368 | 4/1977 | Apple, Jr. ................................. 179/15 |
| 4,347,606 | 8/1982 | Hoogeveen ........................... 370/105 |
| 4,740,961 | 4/1988 | Renner .................................. 370/100 |
| 4,847,877 | 7/1989 | Besseyre ............................... 375/116 |
| 4,930,125 | 5/1990 | Bains .................................... 370/105 |
| 5,005,191 | * 4/1991 | O'Connor et al. ................... 375/368 |
| 5,010,559 | * 4/1991 | O'Connor et al. ................... 375/368 |

* cited by examiner

*Primary Examiner*—Temesghen Ghebretinsae

(57) ABSTRACT

A method and apparatus for detecting framing alignment sequence within a received bit stream. A stream state memory is assigned for each possible location of the framing alignment sequence. Bits of a particular stream are loaded into the respective stream state memory. If the bits do not match an acceptable subsequence of the framing alignment sequence then the stream is eliminated from consideration by writing an exile state to the respective stream state memory. Then subsequently received bits are used to transition either to the next state if the next bit is a correct bit in the framing alignment sequence, or to the exile state if the bit is not the correct bit. After all of the streams have been exiled but one, the remaining stream may contain the framing alignment sequence. However, it may be that a certain number of correctly received bits are required to declare in-frame with sufficient certainty in which case incoming bits will continue to be processed until this is satisfied. Examples are given relating to DS1 superframe and extended superframe framing alignment sequences.

19 Claims, 9 Drawing Sheets

DS1 SUPERFRAME

| FAS1 | Frame 1 payload - 192 bits | FRAME 1 |
|---|---|---|
| FAS2 | Frame 2 payload - 192 bits | FRAME 2 |
| FAS3 | Frame 3 payload - 192 bits | FRAME 3 |
| FAS4 | Frame 4 payload - 192 bits | FRAME 4 |
| FAS5 | Frame 5 payload - 192 bits | FRAME 5 |
| FAS6 | Frame 6 payload - 192 bits | FRAME 6 |
| FAS7 | Frame 7 payload - 192 bits | FRAME 7 |
| FAS8 | Frame 8 payload - 192 bits | FRAME 8 |
| FAS9 | Frame 9 payload - 192 bits | FRAME 9 |
| FAS10 | Frame 10 payload - 192 bits | FRAME 10 |
| FAS11 | Frame 11 payload - 192 bits | FRAME 11 |
| FAS12 | Frame 12 payload - 192 bits | FRAME 12 |

Fig. 1A
(Prior Art)

| |
|---|
| FAS1 = 1 |
| FAS2 = 0 |
| FAS3 = 0 |
| FAS4 = 0 |
| FAS5 = 1 |
| FAS6 = 1 |
| FAS7 = 0 |
| FAS8 = 1 |
| FAS9 = 1 |
| FAS10 = 1 |
| FAS11 = 0 |
| FAS12 = 0 |

Fig. 1B
(Prior Art)

OVERHEAD BIT

DS1 EXTENDED SUPERFRAME

| | | |
|---|---|---|
| | Frame 1 payload - 192 bits | FRAME 1 |
| | Frame 2 payload - 192 bits | FRAME 2 |
| | Frame 3 payload - 192 bits | FRAME 3 |
| FAS1 | Frame 4 payload - 192 bits | FRAME 4 |
| | Frame 5 payload - 192 bits | FRAME 5 |
| | Frame 6 payload - 192 bits | FRAME 6 |
| | Frame 7 payload - 192 bits | FRAME 7 |
| FAS2 | Frame 8 payload - 192 bits | FRAME 8 |
| | Frame 9 payload - 192 bits | FRAME 9 |
| | Frame 10 payload - 192 bits | FRAME 10 |
| | Frame 11 payload - 192 bits | FRAME 11 |
| FAS3 | Frame 12 payload - 192 bits | FRAME 12 |
| | Frame 13 payload - 192 bits | FRAME 13 |
| | Frame 14 payload - 192 bits | FRAME 14 |
| | Frame 15 payload - 192 bits | FRAME 15 |
| FAS4 | Frame 16 payload - 192 bits | FRAME 16 |
| | Frame 17 payload - 192 bits | FRAME 17 |
| | Frame 18 payload - 192 bits | FRAME 18 |
| | Frame 19 payload - 192 bits | FRAME 19 |
| FAS5 | Frame 20 payload - 192 bits | FRAME 20 |
| | Frame 21 payload - 192 bits | FRAME 21 |
| | Frame 22 payload - 192 bits | FRAME 22 |
| | Frame 23 payload - 192 bits | FRAME 23 |
| FAS6 | Frame 24 payload - 192 bits | FRAME 24 |

Fig. 1C
(Prior Art)

| |
|---|
| FAS1 = 0 |
| FAS2 = 0 |
| FAS3 = 1 |
| FAS4 = 0 |
| FAS5 = 1 |
| FAS6 = 1 |

Fig. 1D
(Prior Art)

| Stream_State [1] | S1 | S2 | S3 | ••• | S1 | S2 | S3 |
|---|---|---|---|---|---|---|---|
| ••• | | | | | | | |
| Stream_State [772] | | | | | | | |

Fig. 2C

| Stream_State [1] | S1-1 S2-1 S3-1 | S1-2 S2-2 S3-2 | S1-3 S2-3 S3-3 | S1-4 S2-4 S3-4 | ••• | S1-1 S2-1 S3-1 | S1-2 S2-2 S3-2 | S1-3 S2-3 S3-3 | S1-4 S2-4 S3-4 |
|---|---|---|---|---|---|---|---|---|---|
| ••• | ••• | ••• | ••• | ••• | | | | | |
| Stream_State [193] | | | | | | | | | |

Fig. 2D

DIGITAL SIGNAL FRAMING SYSTEMS AND METHODS

This Appln claims the benefit of Provisional 60/097,097 filed Aug. 19, 1998.

FIELD OF THE INVENTION

The invention relates to systems and methods for searching for and maintenance of frame alignment in incoming digital data streams.

BACKGROUND OF THE INVENTION

It is common for serial data streams to be comprised of sets of contiguous frames with each frame including one or more FAS (frame alignment sequence) bits. The FAS bits constitute the FAS, and are used to delineate frames of an incoming serial bit stream and the position of the frame within a multiframe structure. Delineation of frames offers a receiving station the ability to know exactly what bit of an incoming set of frames is being received at any time.

When a receiving station is receiving frames and the location of the FAS has been determined, it is said to be In-Frame (IF). When the receiving station is not locked to the FAS, it is said to be Out-of-Frame (OOF). The receiver then must invoke a FAS search algorithm in order to find the FAS within the incoming data stream.

U.S. Pat. No. 4,347,606 to Hoogeveen which issued on Aug. 31, 1982, is entitled "Method of Frame Synchronization of a Digital TDM Communication System and Arrangement for Performing the Method" and discloses a method which keeps track of how many FAS bits, starting from the first FAS bit, have been received in each of the possible FAS bit stream locations. Each time a correct bit is received, this count is incremented. Each time an incorrect bit is received, the count is reset to zero, and the search started over again for that particular location. A disadvantage of this system is that the algorithm searches for the FAS in a predetermined order, starting with the first FAS bit. Thus, even for the correct FAS location, most of the time the embedded FAS will be out of phase with the FAS it is being compared with.

U.S. Pat. No. 4,847,877 to Besseyre which issued on Jul. 11, 1989 is entitled "Method and Apparatus for Detecting a Predetermined Bit Pattern Within a Serial Bit Stream" discloses a system in which a four bit subsequence of a twelve bit FAS is used to identify a starting point in the FAS. A table look-up is performed to identify the next eight bits of the FAS. The next twelve bits are compared to these eight bits. If these are found, then the FAS is deemed to have been located. Disadvantageously, the methods provided in Besseyre do not examine the different possible FAS bit streams concurrently and do not deal with mimics. Mimic bit streams exist when at least one potential FAS location which ultimately does not contain the actual FAS contains bits which match the entire FAS for a significant period of time.

SUMMARY OF THE INVENTION

It is an object of the invention to obviate or mitigate one or more of the above identified disadvantages.

A method and apparatus for detecting a framing alignment sequence within a received bit stream are provided. A stream state memory location is assigned for each possible location of the framing alignment sequence. Bits of a particular stream are loaded into the respective stream state memory location. If the bits do not match an acceptable subsequence of the framing alignment sequence then the stream is eliminated from consideration by writing an exile state to the respective stream state memory location. Then subsequently received bits are used to transition either to the next state if the next bit is a correct bit in the framing alignment sequence, or to the exile state if the bit is not the correct bit. After all of the streams have been exiled but one, the remaining stream may contain the framing alignment sequence. However, it may be that a certain number of correctly received bits are required to declare in-frame with sufficient certainty in which case incoming bits will continue to be processed until this is satisfied. Example applications include detection of the DS1 superframe and extended superframe framing alignment sequences.

According to a first broad aspect, the present invention provides a method for the purpose of frame synchronization, of detecting a repeating predetermined M-bit sequence included within an incoming serial bit stream, the M bit sequence being distributed over the bit stream in a predetermined manner in one of N possible streams within the bit stream, and the predetermined pattern containing M unique or semi-unique subsequences each K bits in length allowing for wrap-around within the M-bit pattern, the method comprising the steps of: a) associating with each subsequence a respective state transition bit, the state transition bit being the bit in the repeating predetermined M-bit sequence following the subsequence, each particular subsequence having a respective next subsequence, that being the subsequence consisting of the second through last bits of the particular subsequence and the state transition bit; b) for each of said N possible streams, receiving K bits of the stream and storing them; c) for each stored K bits, determining if they match any of the M unique subsequences in which case the stored bits are a stored subsequence, and if not, eliminating that stream from further consideration; d) receiving a next bit, and if the stream to which it belongs has not been previously eliminated from consideration then looking up the stored subsequence of that stream and determining if the next bit is the state transition bit for that subsequence, and if so storing the next subsequence in place of the stored subsequence, and if not eliminating the stream from further consideration; e) repeating step d) until predetermined criteria have been satisfied.

According to a second broad aspect, the present invention provides a method for detecting a repeating predetermined M-bit pattern included within an incoming serial bit stream, the M bits being distributed over the bit stream in a predetermined manner in one of N possible streams within the bit stream, and the predetermined pattern containing M unique or semi-unique subsequences each K bits in length, the method comprising the steps of: a) associating with each subsequence a respective unique state identifier and a respective state transition bit, the state transition bit being the bit in the repeating predetermined sequence following the subsequence, each state having a respective next state, that being the state associated with the subsequence consisting of the second through last bits of the previous subsequence and the state transition bit; b) for each of said N possible streams, receiving K-1 bits of the stream and storing them; c) for each of said N possible streams, receiving a Kth bit, and determining if the previously received K-1 bits plus the Kth bit match any of the M unique subsequences and if so storing the state identifier for that unique subsequence in place of the stored bits, and if not, eliminating that stream from further consideration; d) receiving a next bit, and if the stream to which it belongs has not previously been eliminated from consideration then looking up the stored state of that stream and determining if the next bit is the state transition bit for that state, and if so storing the state identifier of the next state in place of the stored state, and if not eliminating the stream from further consideration; e) repeating step d) until predetermined criteria have been satisfied.

According to a third broad aspect, the present invention provides an apparatus for detecting a repeating FAS (framing alignment sequence) M bits in length included within an incoming serial bit stream, the M bits being distributed over the bit stream in a predetermined manner in one of N possible streams within the bit stream, and the FAS containing M unique or semi-unique subsequences each K bits in length allowing for wrap-around within the FAS, the apparatus comprising: a stream state memory having K bits of storage for each of said N possible streams; means for receiving K bits of each of said N possible streams and storing them in the stream state memory and for receiving subsequent bits; a state machine in which each of said M unique or semi-unique subsequences is associated with a valid state, with transitions between states occurring upon the reception of a next bit, with a transition to a next valid state occurring if the next bit matches the bit of the predetermined subsequence following the associated subsequence, transitions to an exile state occurring with a bit mismatching the bit of the predetermined subsequence following the associated subsequence, and transitions to the next valid state occurring automatically in the case that the next bit is a don't care bit; a first counter maintaining a count of how many streams are in the exile state; a second counter for maintaining a count which allows a determination of how many consecutive bits of the FAS have correctly been received; a frame synchronization detection engine (FDE) for examining a next received bit, looking up the stored subsequence for the stream to which the next received bit belongs, running the state machine with the stored subsequence and transitioning to the next valid state or to the exile state dependent upon the next bit, and updating the stored subsequence accordingly; wherein the first and second counters are updated if appropriate upon the reception of each bit, and the FDE keeps examining next received bits until the first counter indicates that all but one stream is in the exile state, and the second counter indicates sufficiently many consecutive bits of the FAS have correctly been received.

BRIEF DESCRIPTION OF THE DRAWINGS

Preferred embodiments of the invention will now be described with reference to the attached drawings in which:

FIG. 1A is the DS1 superframe frame format;

FIG. 1B is the DS1 superframe framing alignment sequence;

FIG. 1C is the DS1 extended superframe frame format;

FIG. 1D is the DS1 extended superframe framing alignment sequence;

FIG. 2A is a block diagram for a system for locating a framing alignment sequence within an incoming bit stream, according to an embodiment of the invention;

FIGS. 2B–2D are examples of structures of the state memory of FIG. 2A;

DETAILED DESCRIPTION OF THE PREFERRED EMBODIMENTS

Figures 2A, 2B:
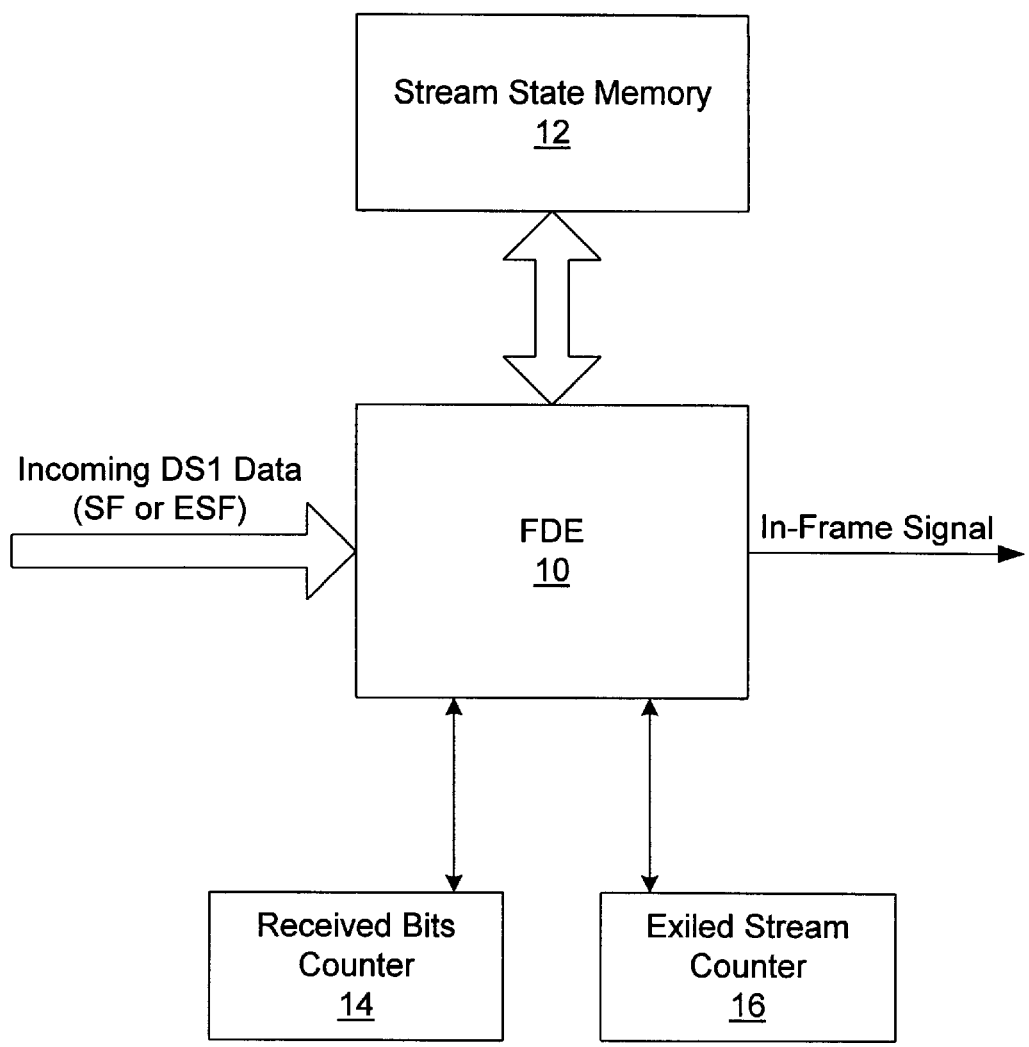

Referring first to FIG. 1A, the DS1 superframe format will be described. A DS1 superframe is a multiframe comprised of twelve frames labelled Frame 1 to Frame 12, each containing 193 bits. The first bit of each frame contains a single framing alignment bit from a predetermined framing alignment sequence (FAS). In the Figure, the framing alignment bits consist of FAS1, FAS2, . . . , FAS12. The remaining 192 bits of each frame contain payload data, namely frame 1 payload, frame 2 payload, . . . , frame 12 payload. In an incoming DS1 stream, multiple DS1 superframes will be received in sequence. The FAS will be embedded repeatedly within the sequence of incoming DS1 frames with each bit in the FAS being separated by 192 intervening payload data bits. If it were known that the first bit received was also the first bit of the FAS then the FAS would consist of bit 1, bit 194, bit 387, . . . of the received bit sequence. More concisely, the FAS would consist of {bit 1+193N, N=0,1 . . . } . In the absence of frame synchronization, the receiver does not know where the first FAS bit is. Thus the FAS could potentially be located somewhere in the sequence {bit i+193N, N=0,1 , . . . }where i is any integer between 1 and 193. Of course, bit i need not necessarily and likely is not the first bit FAS1 of the framing alignment sequence. The bit sequence for a particular value of i will be referred to as a "stream". Thus, incoming data in the DS1 superframe format may be thought of as consisting of 193 streams, namely stream[i], i=1 to 193, and any one of these may contain the FAS.

The FAS for the DS1 superframe format may for example be the 12 bit sequence consisting of the bits 1,0,0,0,1,1,0, 1,1,1,0,0 as illustrated in FIG. 1B. This sequence has the characteristic that any subsequence of four consecutive bits, allowing for wrap-around, is unique.

Referring now to FIG. 2A, an apparatus according to an embodiment of the invention for searching for the FAS within an incoming data stream consists of a FAS Detection Engine (FDE) 10 connected to a state memory 12, a received bits counter 14 and an exiled stream counter 14. While the apparatus can be used for many different frame formats/ FAS, it will be described by way of example for the case where the incoming data is in the DS1 superframe format. The state memory 12 for superframe formatted DS1 data is shown in FIG. 2B and consists of a stream state memory location for each of the 193 streams, namely stream_state [i], i=1 to 193 with each stream state memory location containing four bits of state memory S1,S2,S3,S4. The received bits counter 14 is a counter capable of counting received bits up to a predetermined number described below, and the exiled stream counter 16 is a counter capable of counting up to 193.

Figure 3:
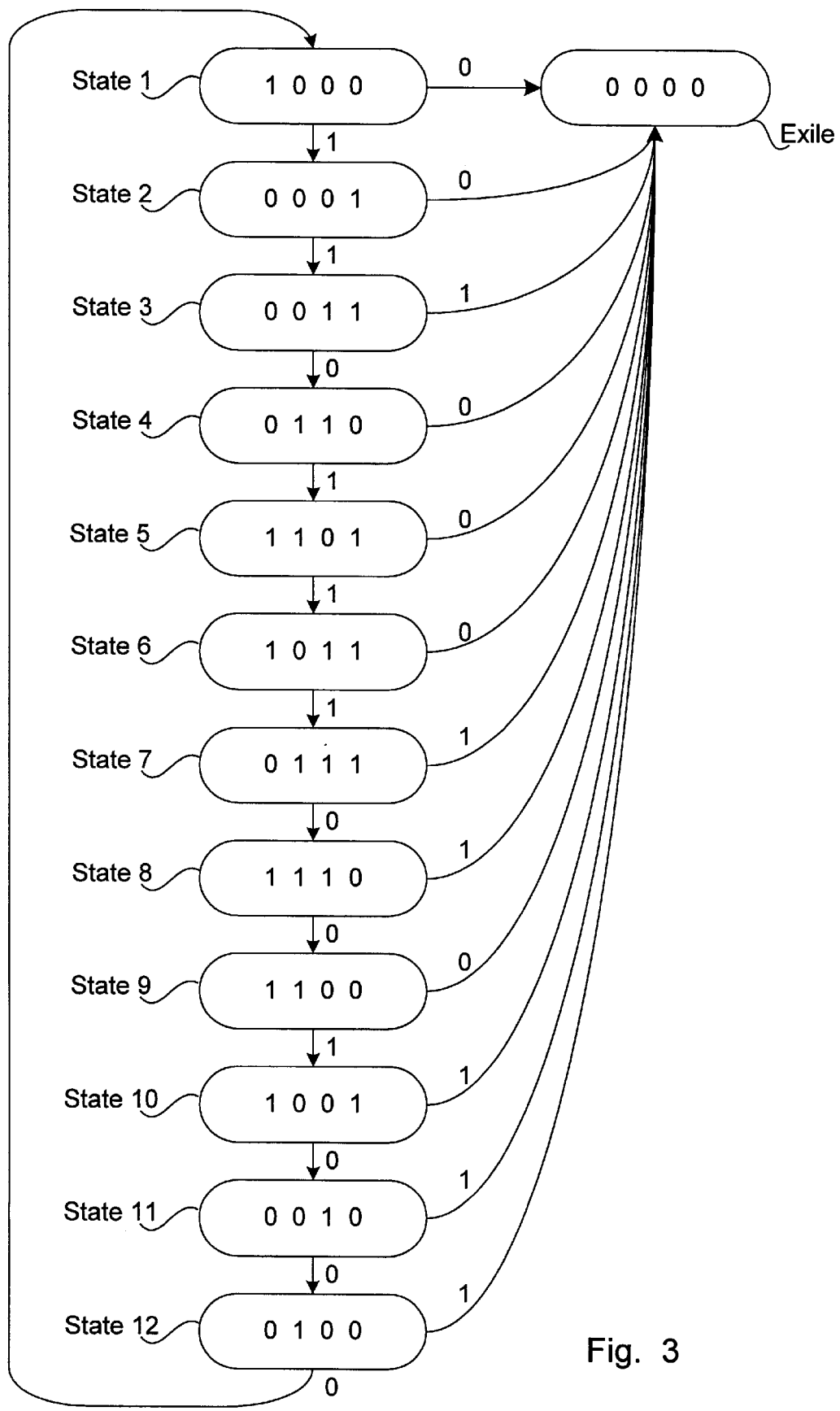
FIG. 3 is a state machine for use with detecting the DS1 superframe framing alignment sequence.

Referring now to FIG. 3, the fact that the FAS contains unique four bit subsequences has been taken advantage of in generating a state machine having twelve states, one for each unique four bit subsequence. State one consists of the first four bits of the FAS, namely 1000. State two consists of the second through fifth bits of the FAS, namely 0001, and so on through state nine which consists of the ninth through twelfth bits of the FAS, namely 1100. The FAS is a repeating sequence and as such states ten through twelve include bits from the end of the FAS and wrap-around bits from the beginning of the FAS. For example, state ten is 1001, and consists of bits ten through twelve of the FAS together with bit one of the FAS. A thirteenth state has been defined, namely 0000 which will be referred to as the "EXILE" state. The only acceptable transitions in the state machine consist of transitions between consecutive states, and transitions from any state to the EXILE state. For each state, there is a state transition bit, this being the bit in the FAS which follows the state bits, which causes a transaction to the next state. A bit which is opposite in polarity to the state transition bit will result in a transition to the EXILE state.

Figure 4A:
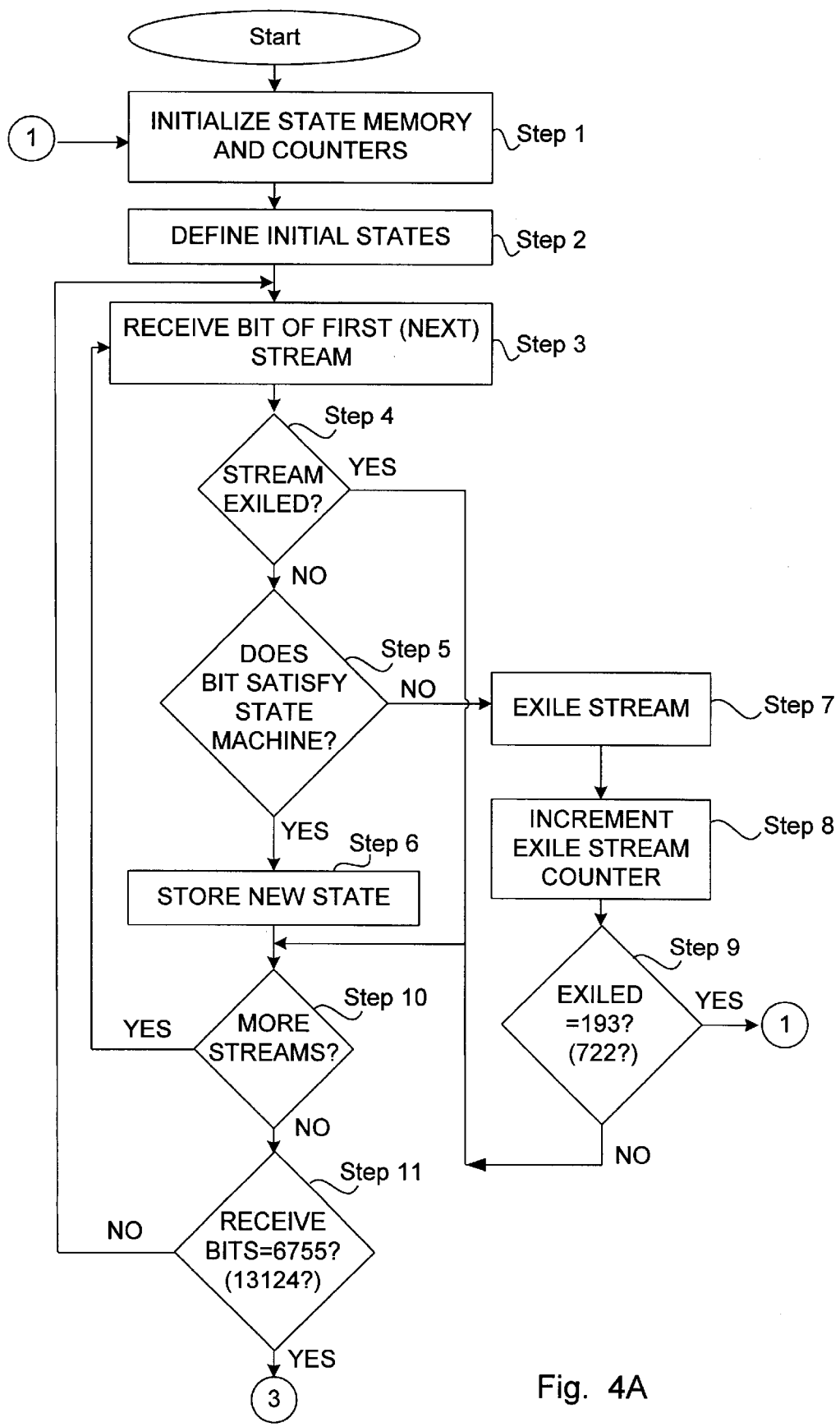
FIG. 4 is a flowchart for a method of detecting the framing alignment sequence using the state machine of FIG. 3, according to an embodiment of the invention.
Figure 4B:
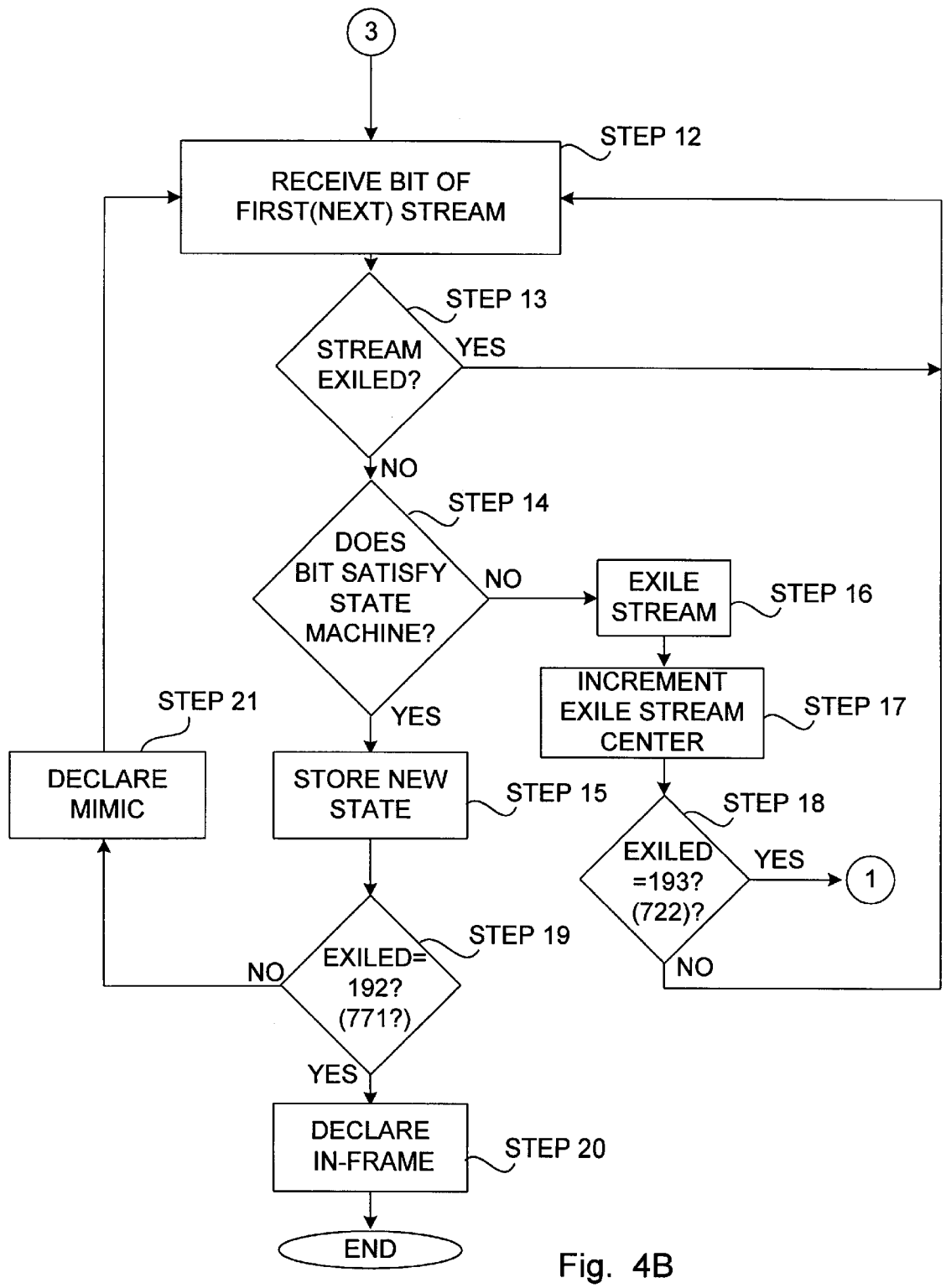

The method implemented by the FDE 10 of FIG. 2A will be described with reference to the flowchart of FIG. 4. Step one is to initialize the stream state memory 12 and the counters 14,16. Stream state memory 12 is initialized by storing four consecutive received bits from each of stream [i], i=1 to 193 into respective stream state memory locations stream_state[i], i=1 to 193. The received bits counter 14 is initialized to zero at the very beginning of the initialization, or to 193×4=772 at the end of the initialization. The exiled stream counter 16 is initialized to zero. Thereafter, the received bits counter 14 is incremented for every bit received.

Step two is to define initial states in the state memory 12. This simply comprises identifying streams with stream_state memories which contain four bits which do not agree with any one of the twelve non-EXILE FAS states. Any such streams are eliminated from further consideration by writing the EXILE state to their respective stream_state memories.

Steps three through ten are conducted for each of the next 193 bits in the received bit stream, namely for one bit in each stream. Step three consists of receiving a bit from the first (next) stream. Step four consists of determining if the particular stream has already been deemed an exiled stream. This is done by determining if the respective stream state memory location contains the EXILE state. If it is an exiled stream, then steps five, six, seven, eight and nine are skipped. If it is not an exiled stream, then step five consists of determining whether the bit satisfies the state machine for that stream. Referring again to FIG. 3, the contents of the stream state memory will define the state for that stream, and it will be one of the twelve states. For each state, in order to undergo a state transition to the next state, the correct next bit in the FAS must be received this being the above defined state transition bit. For example, for a stream in state three, this means that the bits 0,0,1,1 have been received. The next bit in the FAS after these four bits is the state transition bit which in this case is a "0". If a "0" is received than the state undergoes a transition to the next state, namely state 0,1,1,0, by writing the new state to the respective stream state memory location (step six). If a "1" is received, then the sequence 0,0,1,1,1 will have been received, and this does not appear anywhere within the FAS and as such, this stream is exiled by writing the EXILE state to the respective stream_state memory (step seven). When this is done, the exiled stream counter is also incremented (step eight) and a test is conducted to see if all 193 streams have been exiled (step nine). If all the streams have been exiled then the system returns to step one and re-initializes. This means that none of the streams contained the correct FAS. In step ten, a test is made as to whether all 193 streams have been processed in such a manner.

In order to declare frame synchronization, the FAS must have been found in the received bit sequence for a certain predetermined number of bits, the larger this predetermined number, the more certain the conclusion. For example, it may be that for a particular application in which the Super-Frame format is being used, 36 bits of the FAS (three complete SuperFrames each containing 12 bits per multiframe) must be received before the FAS can be said to have been found with sufficient certainty. For our example, this would consist of the FAS repeated three times. Since the received bit counter starts at 0 each time the algorithm is initialized, it can be used to determine how many of the FAS bits have been received. For the case where 36 bits are required, after 36×193=6948 bits have been received and processed according to steps three to ten outlined above, if a single stream remains in the non-exile state, then that stream must contain the FAS, and In-Frame can be declared. While this is an acceptable method of terminating the method, it is not the most efficient. This is because the 36th bit of the FAS may and likely will be received before the 36th bit of all 193 streams is considered, and waiting until the 36th bit of all 193 streams has been considered may result in an unnecessary delay.

Preferably, the algorithm is modified slightly after 35 bits of each stream have been received, (35×193=6755 bits received) as described herein. In step eleven, a test is conducted to determine whether in fact 6755 bits have been received. If not, then the method returns to the beginning of step three to consider another 193 bits. If the required number of bits have been received as determined by step eleven, at least one of the streams must have contained 35 consecutively correct FAS bits. In step twelve a next bit is received. In step thirteen, a test again is made to see if the stream for the next bit has been exiled. If so, then no further steps are required. If not, in step fourteen a test is made to see if next bit is the state transition bit. If not, then the stream is exiled, and the exiled stream counter is increased (steps sixteen, seventeen). If all streams have been eliminated then the method is reset at step one (step eighteen). Otherwise the next bit is received and the method continues at step twelve. If the next bit is the state transition bit, the new state is stored (step fifteen). If in step fifteen the next bit does satisfy the state machine, then for that bit stream at least 36 FAS bits must have been correctly received. As discussed above, for this example this is a predetermined number deemed to be a sufficient number of FAS bits to declare In-Frame (frame synchronization). In step nineteen a test is conducted to determine if exactly one stream contains the FAS, this being true only if the exiled stream counter equals 192 (the number of streams minus one). If this is true, then the FAS has been uniquely determined, the process ends, and In-Frame is declared in step twenty. If this is not true, then more than one stream contains the FAS, and at least one mimic stream must exist. An output indicating the presence of more than one bit stream exhibiting the FAS may be generated at this time if appropriate (step twenty-one). In this case, steps twelve through nineteen are repeated indefinitely until all but one of the potential FAS streams have been eliminated, or until there are 193 exiled streams. When the process ends with a single potential FAS stream remaining, the FAS has been successfully and uniquely determined, and a declaration of In-Frame is made. At any time, the entire process can be reinitialized resulting in the return to step one.

Figure 5:
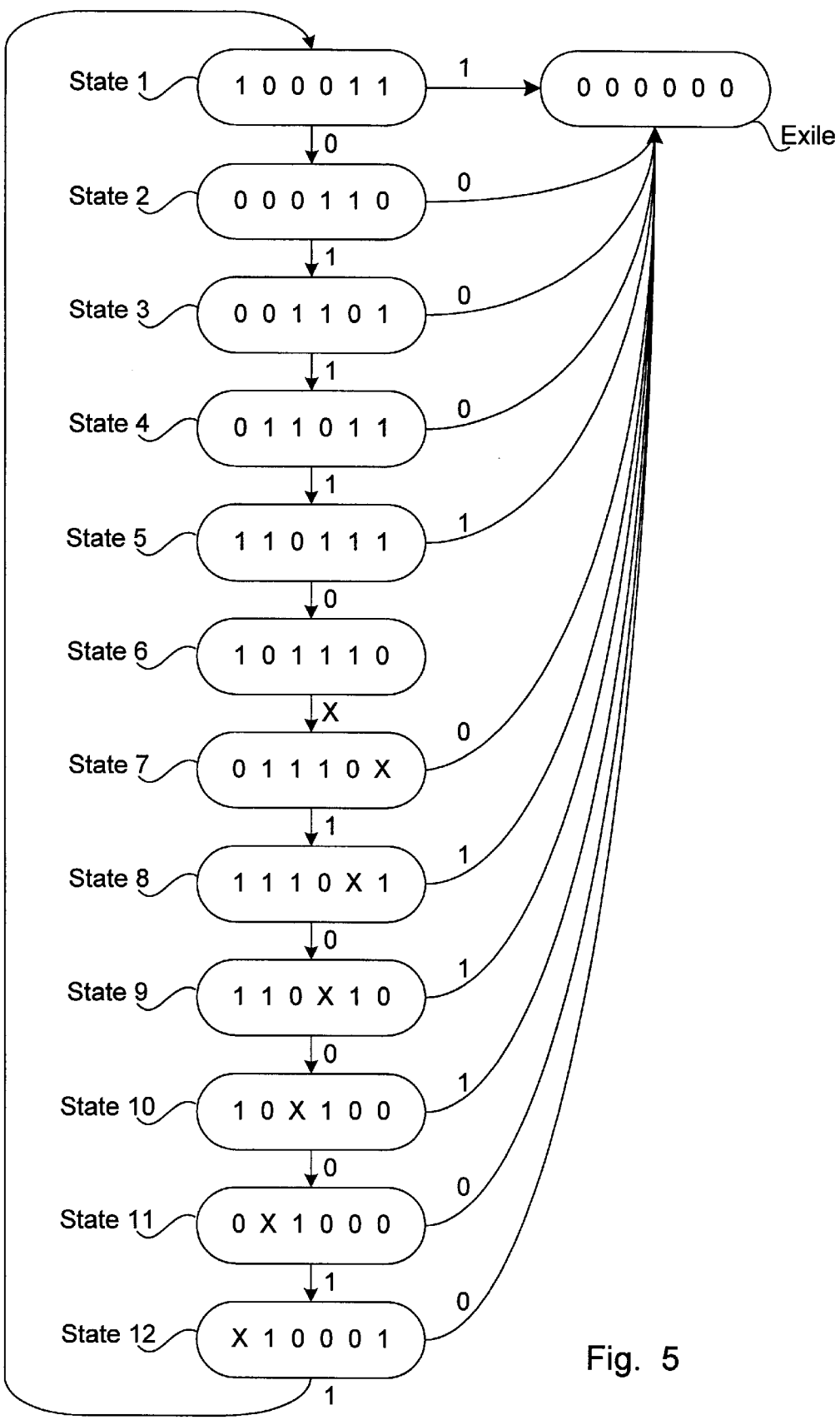
FIG. 5 is another state machine for use with the method of FIG. 4 according to another embodiment of the invention.

It may be that in some applications, certain FAS bit locations may be overwritten with alarm information for example. An example of this is the "Alternate Yellow Alarm (RA1)", (see CCITT Recommendation G.704 published in 1991) in which the twelfth FAS bit is driven to one for extended periods of time (the twelfth bit is otherwise zero). This is called Alternate Yellow Alarm mode. When this mode is active, the FAS detection algorithms must take into consideration that the twelfth bit of the FAS no longer contains FAS information and depending on the state of the Yellow Alarm the twelfth FAS bit may be a one or zero. Therefore, when Alternate Yellow Alarm is active, the FAS detection and tracking circuit must ignore the 12th FAS bit. This complicates the algorithms slightly. A state diagram for this case is shown in FIG. 5 where an "X" bit indicates "don't care", this being shown for the twelfth bit of the FAS. In this case, each state represents a six bit received sequence. The transition from the sixth state to the seventh state occurs independent of the polarity of the state transition bit since the state transition bit is the twelfth bit which is the don't care bit. In this case there are twelve semi-unique states. The states are semi-unique in the sense that in some cases more than one bit sequence defines the same state. For example, state seven results from both the bit sequence 011101, and the bit sequence 011100. Therefore, the size of the per bit stream state memory must be increased to six bits so that six bits may be initially loaded for each stream and the initial state defined. The remaining operation is the same as that described previously. The bits received in don't care bit locations can be extracted by the receiver and interpreted according to whatever mechanism is appropriate.

The above described FAS detection engine has been described for particular application to DS1 SuperFrames. A DS1 extended SuperFrame (ESF) serial data stream is comprised of contiguous extended SuperFrames. Referring now to FIG. 1C, each ESF consists of 24 frames labelled Frame 1 to Frame 24, with each frame containing 192 payload bits preceded by one overhead bit. The FAS for an ESF is a six bit sequence consisting of the bits FAS1,FAS2, FAS3,FAS4,FAS5,FAS6 embedded as every fourth bit in the overhead bit stream as illustrated starting at Frame 4. If it were known that the first bit received was also the first bit of the FAS then the FAS would consist of bit 1, bit 773, bit 1545, . . . of the received bit sequence. More concisely, the FAS would consist of {bit 1+4×193N, N=0,1 . . . }. In the absence of frame synchronization, the receiver does not know where any of the FAS bits are but it does know that one of the six FAS bits is located within the first 772 bits received. Thus the FAS, starting with an arbitrary bit within the FAS, could potentially be located in any of the sequences {bit i+772N, N=0,1, . . . } where i is any integer between 1 and 772. The bit sequence for a particular value of i will be referred to as a "stream". Thus, an incoming DS1 data stream may be thought of as consisting of 772 streams, namely stream[i], i=1,772, and any one of these may contain the FAS. Alternatively, the incoming DS1 data stream may be thought of as consisting of 193 streams each having four phases, namely stream[k,l],k=1 to 193, l=1 to 4.

The FAS for the DS1 ESF format is the six bit sequence consisting of the bits 0,0,1,0,1,1 as illustrated in FIG. 1D. This sequence has the characteristic that any subsequence of three consecutive bits is unique.

An apparatus according to an embodiment of the invention for searching for the FAS within an incoming DS1 ESF stream is the same as that shown in FIG. 2A with the exception that the state memory for this case, shown in FIG. 2C, consists of three bits of state memory S1,S2,S3 for each of the 772 streams, namely stream_state[i], i=1 to 772. Alternatively, as shown in FIG. 2D, the stream state memory may consist of 12 bits of state memory for each of 193 streams having four phases. The received bits counter is a counter capable of counting received bits up to a predetermined number described below, and the exiled stream counter is a counter capable of counting up to 772.

Figure 6:
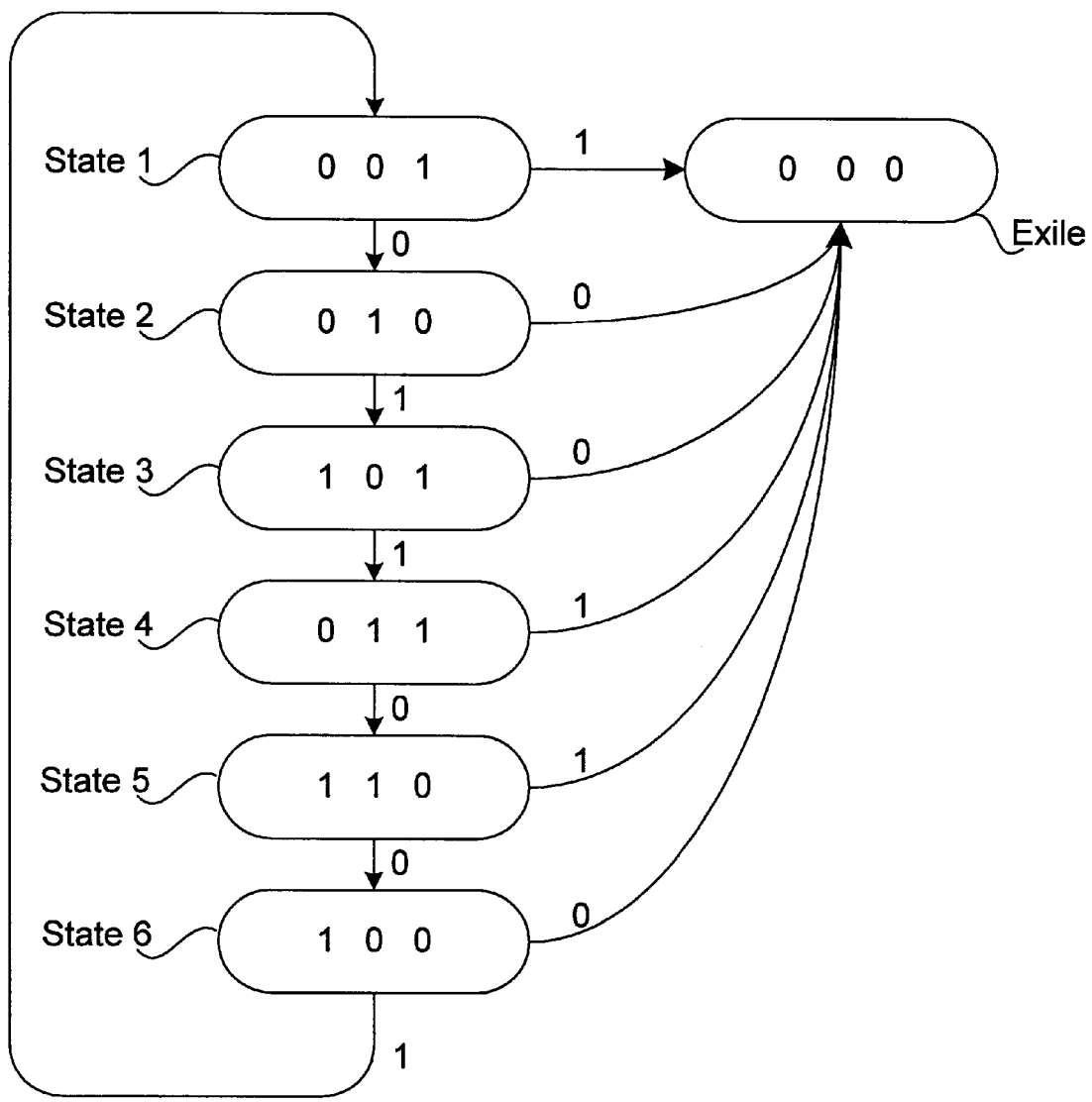
FIG. 6 is another state machine for use with the method of FIG. 4 according to another embodiment of the invention.

Referring now to FIG. 6, a state machine similar to that of Figure is shown for the ESF FAS in this case consisting of six states and the EXILE state.

The method implemented by the FDE for this example will be described with reference to the flowchart of FIG. 4 where steps 9,11,17,18 are defined by the text appearing in brackets. Step one is to initialize the state memory 12 and the counters 14,16. State memory 12 is initialized by storing three bits from each of stream[i], i=1 to 772 into respective state memories stream_state[i], i=1 to 772 or by storing three bits from each of stream[k,l],k=1 to 193,l=1 to 4 into respective state memories stream_state[i], i=1 to 193. The received bits counter 14 is initialized to zero at the very beginning of the initialization, or to 772×3=2316 at the end of the initialization. The exiled stream counter is initialized to zero. Thereafter the received bits counter 14 is incremented for every bit received.

The remainder of the method is the same as that for the SF frame format except for the following:

in steps nine and seventeen, there are 722 possible streams, so the exile stream counter is compared to 722;

in step eleven, since bits of the FAS are required for frame synchronization for ESF, 17 FAS bits will have been received after 13124 bits have been received and thus a comparison to 13124 is performed; and in step eighteen, a comparison of the exile stream counter to 771 is made as this will indicate exactly one stream contains the FAS.

Three specific implementations/applications of the invention have been described in detail above. More generally, an embodiment of the invention may be used in a system which uses a framing alignment sequence of length M, embedded in a known way within an incoming data stream in one of N possible places. This embedding may be single bits with equal spacing between them, or may be any other regular type of embedding. N streams may be identified consisting of data received consecutively in each of the N possible places for the framing alignment sequence. The state memory must contain storage for N stream states. It is assumed that the framing alignment sequence contains M unique or semi-unique subsequences of length K, a unique subsequence being one without don't care bits, and a semi-unique subsequence being one with at least one don't care bit. The storage for the each stream state must be at least K bits in size. Each of the M unique or semi-unique subsequences will be used to define a state in state memory and as such there are M possible states. This requires that the storage for each stream state must be at least $\log_2 M$ bits rounded up. Thus in general, the storage must be at least the larger of K and $\log_2 M$. Each state may be identified by the respective K bit unique or semi-unique subsequence. Alternatively, each state may be identified by some other unique state identifier at least $\log_2 M$ bits in length. The sequence is then searched for in the N streams as described previously. In-Frame would be declared when a single stream was left in a non-EXILE state and at least L bits of the FAS has correctly been received, where L is a predetermined number which is greater than M.

In the above described example, a received bits counter is used to determine the many bits of a FAS has been correctly received. Other techniques for doing this are also possible. For example, a FAS bits counter may be used which counts from zero up to the number of FAS bits required for an In-Frame declaration to be made. Such a counter would be incremented once per frame if at least one of the streams processed during that frame remains in the search process.

It is noted that when $\log_2 M$ is at least one less than K, the per-stream storage must be at least the larger of K-1 and $\log_2 M$. This is because in this case $\log_2 M$ states do not require K bits for storage. If state identifiers are used which are different from the actual K bit subsequences, namely state identifiers $\log_2 M$ bits in length, then these state identifiers may be used in the state machine. The initial state in this case may be defined by reading in the first K-1 bits into memory for each stream, and then determining the initial state from these K-1 bits and the next bit read in for that stream, this next bit and the K-1 bits then being discarded, and the state identifier of the initial state being written to the memory location. This method could be applied to the above described "Yellow Alarm Mode" embodiment to reduce the per-stream memory requirement to five bits from six.

The above described examples have focussed on systems and methods for searching for the FAS. According to another embodiment of the invention, similar methods and systems may be used to track the FAS after it has been declared. After the FAS has been declared, the state diagram may be continuously used to determine the next correct bit, and more particularly to identify and count errors in the FAS. The error count can be used to determine if and when out-of-frame should be declared. This results in the entire FAS searching process being initialized. The error counter could be decremented or cleared when a predetermined number of consecutive correct FAS bits are received.

Any of the above described methods may be implemented using a variety of processing platforms. For example, FPGAs (field programmable gate array), ASICs (application specific integrated circuits), or a general purpose microprocessor containing appropriate code, to name a few examples. In further implementations, the FAS detection engine could be implemented on a first piece of hardware, with the stream state memory in a separate chip, or these could be combined on a single piece of hardware.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. A method for the purpose of frame synchronization, of detecting a repeating predetermined M-bit sequence included within an incoming serial bit stream, the M bit sequence being distributed over the bit stream in a predetermined manner in one of N possible streams within the bit stream, and the predetermined pattern containing M unique or semi-unique subsequences each K bits in length allowing for wrap-around within the M-bit pattern, the method comprising the steps of:

a) associating with each subsequence a respective state transition bit, the state transition bit being the bit in the repeating predetermined M-bit sequence following the subsequence, each particular subsequence having a respective next subsequence, that being the subsequence consisting of the second through last bits of the particular subsequence and the state transition bit;

b) for each of said N possible streams, receiving K bits of the stream and storing them;

c) for each stored K bits, determining if they match any of the M unique subsequences in which case the stored bits are a stored subsequence, and if not, eliminating that stream from further consideration;

d) receiving a next bit, and if the stream to which it belongs has not been previously eliminated from consideration then looking up the stored subsequence of that stream and determining if the next bit is the state transition bit for that subsequence, and if so storing the next subsequence in place of the stored subsequence, and if not eliminating the stream from further consideration;

e) repeating step d) until predetermined criteria have been satisfied.

2. A method according to claim 1 wherein step e) comprises repeating step d) until all but one stream has been eliminated and at least a predetermined number of bits of the remaining stream have been received;

the method further comprising the step of making a declaration of in-frame.

3. A method according to claim 1 wherein:

N=193, K=4 and subsequences are unique, and M=12, and the ith of the 193 streams comprise the bit sequences consisting of bit numbers $\{i+193j, j=1,2,\ldots\}$ within the incoming serial bit stream;

whereby a frame alignment sequence in a DS1 superframe formatted incoming serial bit stream may be found.

4. A method according to claim 1 wherein:

N=193, K=6 and subsequences are semi-unique, at least K of the subsequences containing a don't care bit, and M=12, and the ith of the 193 streams comprise the bit sequences consisting of bit numbers $\{i+193j, j=1,2,\ldots\}$ within the incoming serial bit stream.

5. A method according to claim 1 wherein:

N=772, K=3 and subsequences are unique, and M=6;

whereby a frame alignment sequence in a DS1 extended superframe formatted incoming serial bit stream may be found.

6. A method according to claim 1 wherein step e) comprises the steps of:

maintaining a first count enabling a determination of how many bits of the predetermined sequence have been received;

repeating step d) at least until the first count reaches at least a first predetermined number.

7. A method according to claim 6 wherein step e) further comprises the steps of:

maintaining a second count of how many streams have been eliminated from further consideration;

repeating step d) at least until the second count reaches N-1.

8. A method according to claim 6 wherein the step of maintaining the first count comprises the step of counting incoming bits in the serial bit stream.

9. A method according to claim 7 further comprising the step of declaring that a mimic stream exists when the first count exceeds a second predetermined number and the second count is less than N-1.

10. A method according to claim 1 wherein step e) comprises:

repeating step d) enough times such that L-1 bits have been considered for each possible stream, where L is a predetermined integer greater than M;

repeating step d) until an Lth bit is received which is the state transition bit of a stream which has not been eliminated from consideration and all but N-1 streams have been eliminated from further consideration.

11. A method according to claim 1 further comprising the step of restarting the method at step b) if all N streams are eliminated from further consideration.

12. A method according to claim 2 further comprising the steps of, after said predetermined criteria have been satisfied repeating the step of:

f) receiving a next bit, and if the stream to which it belongs is said remaining stream, then looking up the stored subsequence of that stream and determining if the next bit is the state transition bit for that subsequence and if not so then incrementing an error counter, and storing the next subsequence in place of the stored subsequence;

g) if the error counter satisfies a predetermined criteria then starting the method back at step b).

13. A method according to claim 12 further comprising the step of decrementing or clearing the error counter when a predetermined number of consecutive bits of said remaining stream are received which have not resulted in said error counter being incremented.

14. A method for detecting a repeating predetermined M-bit pattern included within an incoming serial bit stream, the M bits being distributed over the bit stream in a predetermined manner in one of N possible streams within the bit stream, and the predetermined pattern containing M unique or semi-unique subsequences each K bits in length, the method comprising the steps of:

a) associating with each subsequence a respective unique state identifier and a respective state transition bit, the state transition bit being the bit in the repeating predetermined sequence following the subsequence, each state having a respective next state, that being the state associated with the subsequence consisting of the second through last bits of the previous subsequence and the state transition bit;

b) for each of said N possible streams, receiving K-1 bits of the stream and storing them;

c) for each of said N possible streams, receiving a Kth bit, and determining if the previously received K-1 bits plus the Kth bit match any of the M unique subsequences and if so storing the state identifier for that unique subsequence in place of the stored bits, and if not, eliminating that stream from further consideration;

d) receiving a next bit, and if the stream to which it belongs has not previously been eliminated from consideration then looking up the stored state of that stream and determining if the next bit is the state transition bit for that state, and if so storing the state identifier of the next state in place of the stored state, and if not eliminating the stream from further consideration;

e) repeating step d) until predetermined criteria have been satisfied.

15. An apparatus for detecting a repeating FAS (framing alignment sequence) M bits in length included within an incoming serial bit stream, the M bits being distributed over the bit stream in a predetermined manner in one of N possible streams within the bit stream, and the FAS containing M unique or semi-unique subsequences each K bits in length allowing for wrap-around within the FAS, the apparatus comprising:

a stream state memory having K bits of storage for each of said N possible streams;

means for receiving K bits of each of said N possible streams and storing them in the stream state memory and for receiving subsequent bits;

a state machine in which each of said M unique or semi-unique subsequences is associated with a valid state, with transitions between states occurring upon the reception of a next bit, with a transition to a next valid state occurring if the next bit matches the bit of the predetermined subsequence following the associated subsequence, transitions to an exile state occurring with a bit mismatching the bit of the predetermined subsequence following the associated subsequence, and transitions to the next valid state occurring automatically in the case that the next bit is a don't care bit;

a first counter maintaining a count of how many streams are in the exile state;

a second counter for maintaining a count which allows a determination of how many consecutive bits of the FAS have correctly been received;

a frame synchronization detection engine (FDE) for examining a next received bit, looking up the stored subsequence for the stream to which the next received bit belongs, running the state machine with the stored subsequence and transitioning to the next valid state or to the exile state dependent upon the next bit, and updating the stored subsequence accordingly;

wherein the first and second counters are updated if appropriate upon the reception of each bit, and the FDE keeps examining next received bits until the first counter indicates that all but one stream is in the exile state, and the second counter indicates sufficiently many consecutive bits of the FAS have correctly been received.

16. An apparatus according to claim 15 wherein:
N=193, K=4 and subsequences are unique, and M=12, and the ith of the 193 streams comprise the bit sequences consisting of bit numbers {i+193j, j=1,2, . . . } within the incoming serial bit stream.

17. An apparatus according to claim 15 wherein:
N=193, K=6 and subsequences are semi-unique, at least K of the subsequences containing a don't care bit, and M=12, and the ith of the 193 streams comprise the bit sequences consisting of bit numbers {i+193j, j=1,2, . . . } within the incoming serial bit stream.

18. An apparatus according to claim 15 further comprising means for extracting an independent information stream from any don't care bits contained in the incoming serial bit stream.

19. An apparatus according to claim 15 wherein:
N=772, K=3 and subsequences are unique, and M=6.

* * * * *